United States Patent [19]

Perego

[11] 4,354,689
[45] Oct. 19, 1982

[54] ADJUSTABLE BABY STROLLER HANDLE ROD

[76] Inventor: Giuseppe Perego, Via de Gasperi, 20043 - Arcore (Milano), Italy

[21] Appl. No.: 215,632

[22] Filed: Dec. 11, 1980

[30] Foreign Application Priority Data

Mar. 31, 1980 [IT] Italy .................. 21347/80[U]

[51] Int. Cl.³ ............................................ B62B 1/12
[52] U.S. Cl. .............................. 280/47.37 R; 16/115
[58] Field of Search ............... 280/47.37 R; 403/110, 403/109; 16/115

[56] References Cited

U.S. PATENT DOCUMENTS 1,971,751  8/1934  Keuffel ........................ 403/110
4,284,287  8/1981  Esposito ................. 280/47.37 R

FOREIGN PATENT DOCUMENTS 1544370  9/1968  France ........................ 403/110

Primary Examiner—Robert J. Spar
Assistant Examiner—Donald W. Underwood
Attorney, Agent, or Firm—McGlew and Tuttle

[57] ABSTRACT

A device for adjusting the height of the handles of a baby's carriage or stroller, comprising two telescopic tubes one sliding in the other, the handle connected to one tube, and a flat spring with two arms having a V shape fixed inside the inner tube. The spring ends with a pin protruding from a hole at the bottom of the inner tube, the pin being capable of engaging any one of several holes provided for the purpose in the outer tube with the holes being located at equidistant intervals along the entire height of the outer tube.

1 Claim, 3 Drawing Figures

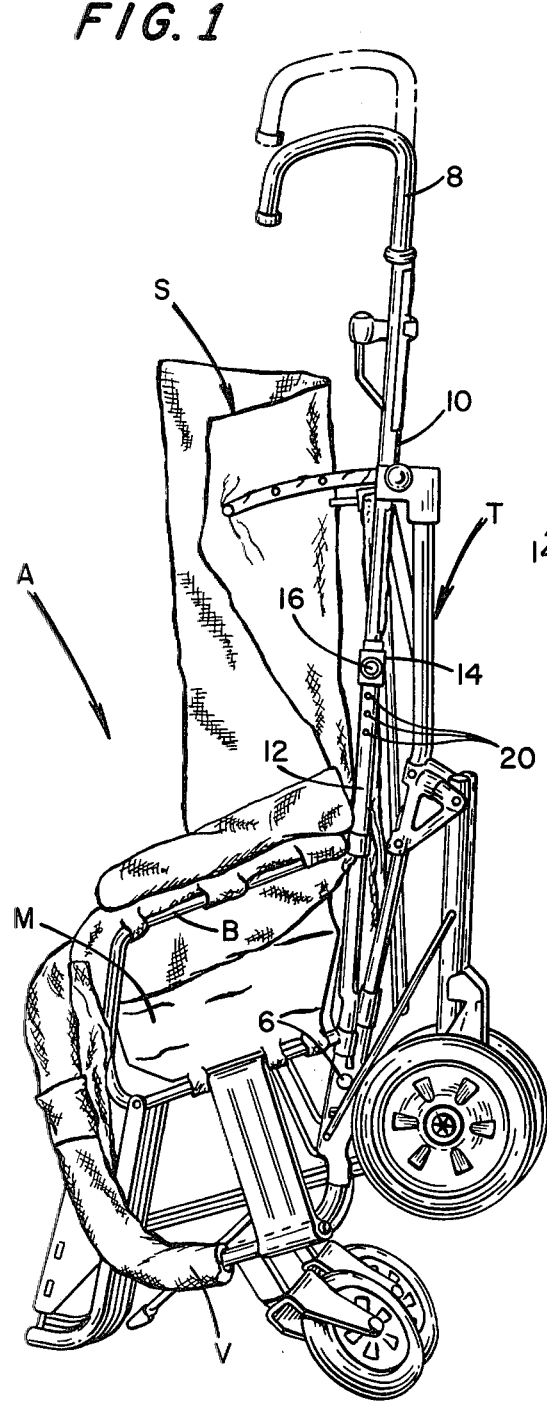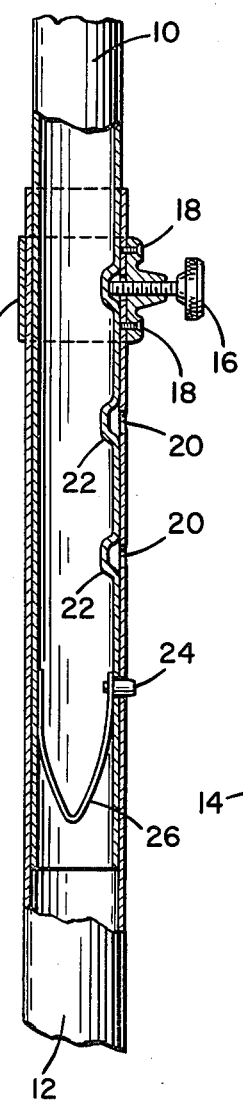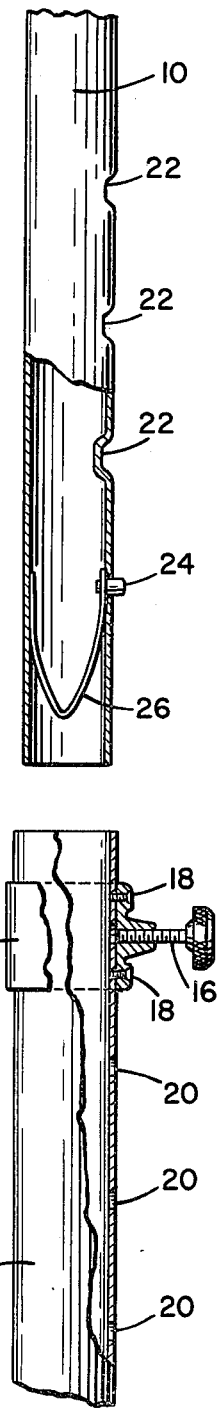

ADJUSTABLE BABY STROLLER HANDLE ROD

FIELD AND BACKGROUND OF THE INVENTION

The present invention relates to a new and useful device for adjusting the height of the handle rods of baby's pushchairs or strollers especially of the type of stroller that folds up like an umbrella for easy carrying.

SUMMARY OF THE INVENTION

The device for adjusting the height of the handle rods or tubes of the invention comprises two telescopic tubes for each rod, one sliding in the other. The rods can be fixed in one or several positions by means of an end pin of a flat spring which is integral with the inner tube. The pin engages a hole at the bottom of the inner tube and any one of the several holes in the outer tube.

A sleeve is connected to the outer tube and carries a threaded shaft which is connected to a knob. The inner tube is provided with a plurality of recesses or indentations at spaced locations corresponding to the locations of the holes in the outer tube. The threaded shaft is turned with the knob to extend into one of the recesses to fix the tubes with respect to each other.

Accordingly an object of the present invention is to provide an adjustment device for adjusting the height of a baby stroller handle comprising, an outer tube, an inner tube telescopically and slidably engaged in the outer tube, the handle connected to one of the inner and outer tubes, a flat V-shaped spring having two arms, one arm fixed to an interior of said inner tube, a pin extending from the other of said two arms, said inner tube having a hole, the pin extending through the hole, the outer tube having a plurality of spaced holes therealong, the pin extending into one of the outer tube holes to fix the position of the outer tube with respect to the inner tube.

A further object of the invention is to provide such an adjustment device which includes a sleeve fixed to the outer tube, a screw shaft threaded into the sleeve, a knob connected to the screw shaft, the inner tube having a plurality of recesses therealong corresponding in spacing to the spacing of the outer tube holes, the screw shaft being threaded inwardly to engage into one of the recesses to further fix the position of the outer tube with respect to the inner tube.

A further object of the invention is to provide an adjustment device for a baby stoller handle which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a side elevational view partially in perspective of a baby stroller handle arrangement connected to a collapsable stroller shown in its collapsed position;

FIG. 2 is a side sectional view, partially in elevation of the adjustment device for adjusting the height of a baby stroller handle; and FIG. 3 is an exploded side sectional view, partially in elevation of the device of FIG. 2.

DESCRIPTION OF THE PREFERRED EMBODIMENT

Turning to the drawings in particular, the invention embodied therein, in FIG. 1, comprises an adjustment device for the handle or handles of a baby stroller which is of the type that is collapsable according to applicant's previous U.S.A. patent application Ser. No. 123,444, and Italian application No. 26.390/A/79 applied for Oct. 10, 1979, utility patent application No. 22.833 B/79 and design model application No. 22.823B/79.

In FIG. 1, the letter A designates the pushchair or stroller, the letter T the pushchair frame, the letter S the back and the letter M the seat, while the side arms are designated by the letter B and the front arm, formerly folding, by the letter V.

Each of the two rods whose top parts end with handles 8 is fixed at the bottom by known means with hinge 6 to an arm of frame T.

The rods both comprise two telescopic tubes, the one sliding in the other, more precisely an inner tube 10 and outer tube 12.

Inner tube 10 is provided with recesses 22, disposed one atop the other at equidistant intervals along a large portion over its entire height. The outer tube 12 is provided with a series of holes 20 designed to match recesses 22.

Inside tube 10 there is fixed a flat spring with two arms in a V-shape ending in a pin 24 which engages a hole located in the bottom section of the inner tube 10 and one of the holes 20 of outer tube 12, so that the person wheeling the pushchair A can adjust handles 8 to the height most convenient for her or him.

In order to prevent this preset position from being inadvertently modified, sleeve 14 is provided which is fixed by means of screw 18 to outer tube 12 and in one of the recesses 22 of inner tube 10 by means of screws shaft with knob 16.

While a specific embodiment of the invention has been shown and described in detail to illustrate the application of the principles of the invention, it will be understood that the invention may be embodied otherwise without departing from such principles.

What is claimed is:

1. An adjustment device for adjusting the height of a baby stroller handle comprising an outer tube, an inner tube telescopically and slidably engaged in said outer tube, the handle connected to one of said inner and outer tubes, a flat V-shaped spring having two arms, one arm fixed to the inside of said inner tube, a pin extending from the other of said two arms, said inner tube having a hole therethrough with said pin extending through said hole, said outer tube having a plurality of spaced holes therealong, said pin engaged through one of said outer tube holes to fix the position of said outer tube with respect to said inner tube, a sleeve connected to said outer tube, a screw shaft threaded into said sleeve, a knob connected to said screw shaft for turning said screw shaft to extend said screw shaft inwardly of said outer tube, said inner tube having a plurality of recesses corresponding to said outer tube holes, said screw shaft extending into one of said recesses to further fix the position of said outer tube with respect to said inner tube, said outer tube holes being equally spaced along a length of said outer tube, said recesses corresponding in number and location to said outer tube holes, said outer tube having one additional hole spaced from a last one of said plurality of holes in said outer tube, a distance equal to the spacing between said outer tube holes through which said screw shaft is extendible.

* * * * *